US012572386B2

(12) United States Patent
Ecker et al.

(10) Patent No.:     US 12,572,386 B2
(45) Date of Patent:       Mar. 10, 2026

(54) AUTOMATED TASK MANAGEMENT IN ANALYTICS COMPUTING SYSTEMS

(71) Applicant: SAP SE, Walldorf (DE)

(72) Inventors: Nele Ecker, Heidelberg (DE); Nadine Engelhardt, Heidelberg (DE); Amanda Jean Tichenor, Heidelberg (DE); Roman Moehl, Zwingenberg (DE); Johannes Huhn, Heidelberg (DE)

(73) Assignee: SAP SE, Walldorf (DE)

( * ) Notice: Subject to any disclaimer, the term of this patent is extended or adjusted under 35 U.S.C. 154(b) by 661 days.

(21) Appl. No.: 17/988,237

(22) Filed: Nov. 16, 2022

(65) Prior Publication Data

US 2024/0160481 A1     May 16, 2024

(51) Int. Cl.
G06F 9/50             (2006.01)
(52) U.S. Cl.
CPC .................................. G06F 9/5027 (2013.01)
(58) Field of Classification Search
None
See application file for complete search history.

(56) References Cited

U.S. PATENT DOCUMENTS

| | | | | | |
|---|---|---|---|---|---|
| 10,063,543 | B2 * | 8/2018 | Alonso Cebrian | ..... | H04L 63/08 |
| 11,075,918 | B2 * | 7/2021 | Pereira | .................. | H04L 63/102 |
| 11,782,584 | B2 * | 10/2023 | Hamze | ...................... | G06F 8/20 |
| | | | | | 715/762 |

| | | | | | |
|---|---|---|---|---|---|
| 2005/0117587 | A1 * | 6/2005 | Kawato | ................. | G06F 9/5027 |
| | | | | | 370/395.21 |
| 2007/0294697 | A1 * | 12/2007 | Theimer | ............... | G06F 9/5027 |
| | | | | | 718/102 |
| 2010/0142989 | A1 * | 6/2010 | Oak | ........................ | G03G 21/02 |
| | | | | | 399/80 |
| 2011/0153624 | A1 * | 6/2011 | Aigner | .................. | G06F 16/252 |
| | | | | | 707/754 |
| 2012/0072972 | A1 * | 3/2012 | Christiansen | ....... | H04L 63/0815 |
| | | | | | 726/5 |
| 2014/0343943 | A1 * | 11/2014 | Al-Telmissani | ........ | G06F 21/32 |
| | | | | | 704/246 |
| 2014/0351175 | A1 * | 11/2014 | Venkat | .................. | H04W 4/029 |
| | | | | | 706/46 |
| 2018/0107513 | A1 * | 4/2018 | Devi | ....................... | G16H 50/50 |
| 2018/0255137 | A1 * | 9/2018 | Hu | ........................ | H04L 63/102 |
| 2019/0102525 | A1 * | 4/2019 | Vaishnav | ................ | G06F 21/31 |
| 2021/0184858 | A1 * | 6/2021 | Perry | ...................... | G06F 21/31 |
| 2022/0005039 | A1 * | 1/2022 | Hires | ................. | G06Q 20/4014 |

* cited by examiner

*Primary Examiner* — Hiren P Patel
(74) *Attorney, Agent, or Firm* — SCHWEGMAN LUNDBERG & WOESSNER, P.A.

(57)                    ABSTRACT

Various examples are directed to systems and methods for configuring an analytics computing system to perform an automated task. The computing system may receive from a first user computing device associated with a first user, a request to create a first automated task. The computing system may send a first authorization request to a first assignee user computing device associated with the first assignee user and receive a first reply message indicating that the first assignee user authorizes use of the credential of the first assignee user for the first automated task. The computing system may configure the first automated task to execute using the credential of the first assignee user upon occurrence of the first start condition for the first automated task.

20 Claims, 9 Drawing Sheets

500

700

702    704    102

701

703

705

AUTOMATED TASK MANAGEMENT IN ANALYTICS COMPUTING SYSTEMS

BACKGROUND

Analytics computing systems are implemented for enterprises, such as business enterprises, to provide analysis of data. An analytics computing system may include software and/or hardware that are arranged to gather, integrate, analyze, and/or present insights regarding underlying data to various users.

BRIEF DESCRIPTION OF DRAWINGS

The present disclosure is illustrated by way of example and not limitation in the following figures.

DETAILED DESCRIPTION

Figure 1:
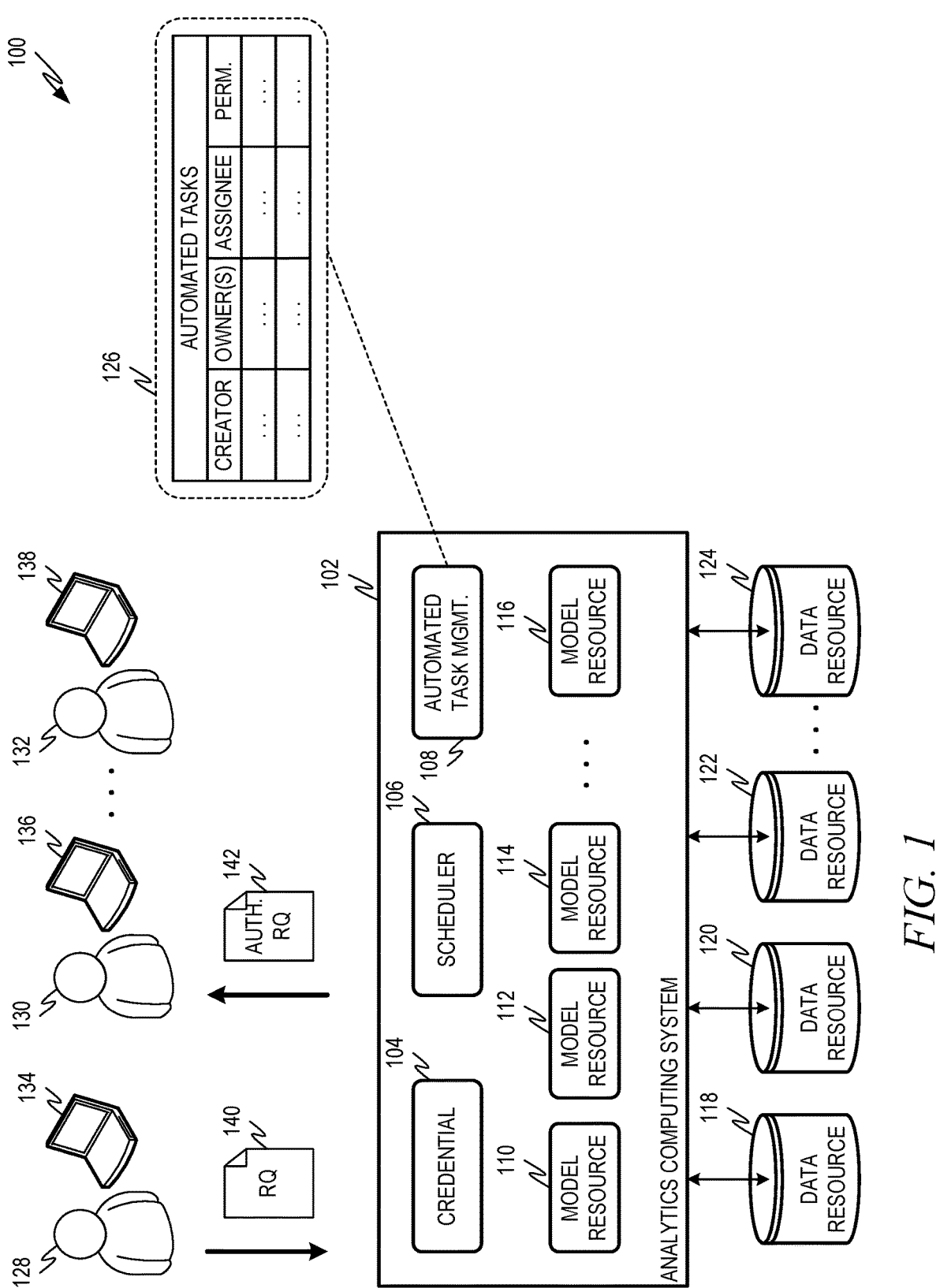
FIG. 1 is a diagram showing one example of an environment including an analytics computing system configured to execute automated tasks.

An analytics computing system can be configured to perform various tasks using analytics computing system resources such as, for example, data resources and model resources. Tasks performed by an analytics computing system can include, for example, providing various reports, forecasts, responses to user queries, and/or the like based on underlying resources. An example analytics computing system is the SAP® Analytics Cloud application available from SAP SE of Waldorf, Germany.

The resources utilized by an analytics computing system can include data resources and model resources. A data resource may be a unit of data used by the analytics computing system to perform one or more tasks. For example, a data resource may be or include a database management system, a table, a record, or any other suitable unit of data. A model resource may be a component that acts on one or more data resources. In some examples, a model resource includes a trained machine learning model that operates on one or more data resources to provide analysis of the data resource. In another example, a model resource may include an arrangement or organization of data such as, for example, a knowledge graph.

Consider an example enterprise that manufactures a product for sale. The example enterprise may utilize an analytics computing system that is coupled to data resources describing raw materials, data resources describing bills-of-materials for products to be manufactured, data resources describing manufacturing records, data resources describing sales records, and/or the like. In this example, the analytics computing system may also utilize model resources such as, for example, a manufacturing cost model that predicts a cost of manufacturing the product in view of the various data resources.

The enterprise may also use the analytics computing system to track sales data. For example, the analytics computing system may be coupled to data resources describing units sold, unit prices, the location of sales, and/or the like. Model resources related to sales data may include, for example, a sales projection model that projects a sales level for a future quarter or other time period, a realization model that projects sales revenue for a future quarter or other time period and/or the like.

Consider another example in which the enterprise employs various employees. Such an enterprise may utilize an analytics computing system that is coupled to data resources comprising employee data such as, for example, employee salary, employee education or professional certification information, and/or the like. The example analytics computing system may also utilize one or more model resources such as, for example, a model for projecting employee salary expenses, a model for projecting real estate costs to provide work areas for employees, space and/or the like.

In some examples, the analytics computing system may be configured to access the data resources and/or model resources across different types of data and model resources. Referring to the example above, the analytics computing system may be configured to consider the output of the sales forecast model when projecting employee salary requirements for a future time period. Consider another example in which the analytics computing system may consider a sales forecast when determining the cost of raw materials for manufacturing (e.g., considering a bulk discount on raw materials).

In some examples, an analytics computing system may be configured to execute one or more automated tasks. An automated task may be a task that the analytics computing system executes automatically (e.g., without intervention by a human user). For example, the analytics computing system may begin the execution of an automated task upon detecting the occurrence of a start condition for the automated task. Example start conditions may include, a date, time, a data variable having a certain value, and/or the like. In some examples, a start condition may include more than one factor. For example, an automated task may be configured to execute at the analytics computing system on Friday afternoons, but only if sales for the week are above the threshold value.

Consider an example in which the analytics computing system uses an automated task to generate a quarterly sales report. In this example, the start condition automated task may be a date, such as the last day of a quarter, or a date and time such as 5:00 PM on the last day of the quarter. The analytics computing system may generate the quarterly sales report each time that the start condition is true. The quarterly sales report may draw from data resources and/or model resources. For example, data resources may be used to generate various values provided in the report such as, for example, raw sales of different products and models, sales in different geographic regions or locations, and/or the like. In some examples, a quarterly sales report may also utilize model resources. For example, a quarterly sales report may include projections of sales during the next quarter. The projections may be generated by a model resource at the analytics computing system.

Consider another example in which an automated task at the analytics computing system generates an exception report when the price of a raw material item exceeds a threshold value. In this example, the start condition may occur when the price of the raw material item exceeds the threshold value. The exception report may utilize various data resources at the analytics computing system such as, for example, data describing the price of the raw material, data describing the price of the product made from the raw material, and/or the like. The exception report may also utilize various model resources at the analytics computing system such as, for example, a machine learning model trained to project future prices of the raw material and/or other raw materials making up the product.

Although analytics computing systems may be arranged to perform automated tasks, the performance of automated tasks utilizing various data and/or model resources can create challenges. For example, different data and/or model resources at the analytics computing system may be selectively accessible to different users. For example, data resources describing confidential employee personnel matters may be accessible to select users in the human resources department only. Also, for example, model resources for forecasting future sales may be accessible to select users in a sales and/or marketing department, but may not be accessible, for example, to every user in engineering.

In some examples, it is desirable for automated tasks to be configured by an administrative user, such as a user from an information technology (IT) department. For example, a user from human resources or another business department may lack technical knowledge necessary to configure an automated task. Also, in some examples, configuring an automated task at an analytics computing system may not be at an efficient use of a business user's time. As a result, it may be desirable to permit administrative users to generate automated tasks.

One obstacle to permitting administrative users to configure automated tasks is that it may not be desirable to provide the administrative users with credentials to access the same analytics computing system resources as the business users. For example, it may not be desirable to permit administrative users to access data resources describing confidential personnel issues. Similarly, it may not be desirable to permit administrative users to access model resources including proprietary sales projections. Also, even if one were to grant credentials to access different data and/or model resources of the analytics computing system to an administrative user or users, doing so may entail providing a single administrative user and/or a small group of administrative users with credentials to a wide range of data and/or model resources. This may create additional security risks.

These and other challenges may be addressed by configuring an analytics computing system to perform automated tasks using the credentials of one or more assignee users. For example, a creator user, who may be an administrative user, may configure the analytics computing system to execute an automated task using a credential of the assignee user. In this way, it may not be necessary for the creator user's credential to permit access all of the data and/or model resources that are used to perform the automated task. In various examples, the analytics computing system sends an authorization request to the assignee user. The assignee user may authorize the use of the assignee user's credential for the automated task or may decline, as described herein.

FIG. 1 is a diagram showing one example of an environment 100 including an analytics computing system 102 configured to execute automated tasks. The analytics computing system 102 may be or include any suitable computing system such as, for example, an instance of the SAP® Analytics Cloud application available from SAP SE of Waldorf, Germany. The analytics computing system 102 may be implemented in various different suitable hardware arrangements. For example, the analytics computing system 102 may be implemented in whole or in part at a cloud environment. Also, in some examples, the analytics computing system 102 may be implemented, in whole or in part, at an on-premise computing system.

The environment 100 also includes users 128, 130, 132 who access the analytics computing system 102 via user computing devices 134, 136, 138. The user computing devices 134, 136, 138 may be any suitable computing devices such as, for example, desktop computers, laptop computers, mobile computers, tablet computers, and/or the like. In some examples, the users 128, 130, 132 are associated with an enterprise implementing and/or using the analytics computing system 102. For example, the analytics computing system 102 may be implemented at a tenancy of a cloud environment. The users 128, 130, 132 may be associated with an enterprise that has purchased and/or rented access to the tenancy. Also, in some examples, the users 128, 130, 132 may be associated with an enterprise implementing the analytics computing system 102 in an on-premise computing system.

The analytics computing system 102 may utilize various model resources 110, 112, 114, 116 and various data resources 118, 120, 122, 124. Data resources 118, 120, 122, 124 may be or comprise data stored at any suitable data store such as, for example, a database management system. Data resources 118, 120, 122, 124 may be authorized at various different scales. In some examples, a data resource 118, 120, 122, 124 may be a database or database management system. In other examples, a data resource 118, 120, 122, 124 may be a database table, a database record, and or any other suitable unit of data. In some examples, one or more of the data resources 118, 120, 122, 124 may be stored at data bases and/or other data storage units implemented as components of the analytics computing system 102. In other examples, one or more of the data resources 118, 120, 122, 124 are stored at data bases and/or other data storage units distinct from the analytics computing system 102. For example, the analytics computing system 102 may communicate with one or more of the data resources 118, 120, 122, 124 remotely.

Model resources 110, 112, 114, 116 may include various different kinds of models utilized by the analytics computing system 102. In some examples, one or more of the model resources 110, 112, 114, 116 may be or include machine learning models trained to generate results based on input data. In some examples, model resources 110, 112, 114, 116 may be used to generate data to populate one or more of the data resources 118, 120, 122, 124. Model resources may be stored at one or more databases and/or other data storage units at the analytics computing system 102, and/or may be stored remotely.

The analytics computing system 102 may comprise a credential subsystem 104, a scheduler subsystem 106, and an automated task management subsystem 108. The various subsystems 104, 106, 108 may be implemented in hardware or software. In some examples, the subsystems 104, 106, 108 comprise distinct units of executable code. For example, the analytics computing system 102 may be implemented according to a micro-services structure. The various subsystems 104, 106, 108 may include distinct micro-services executing, for example, in distinct containers or other similar runtime environments.

The credential subsystem 104 may manage access to the resources 110, 112, 114, 116, 118, 120, 122, 124 of the analytics computing system 102. For example, users 128, 130, 132 may have a credential that is associated at the credential subsystem 104 with a level of access to the analytics computing system 102 enjoyed by the respective user 128, 130, 132. A user's credential may be an indication of the user, such as a user name, password, permanent token, temporary token, or other unique indicator of the user 128, 130, 132. The credential subsystem 104 may store an association between user credentials and corresponding levels of access to the analytics computing system 102, including resources thereof.

For example, a user's credential may be used by the credential subsystem 104 to determine which resources 110, 112, 114, 116, 118, 120, 122, 124 the user is authorized to access and, in some examples, what level of access the user is permitted to each resource 110, 112, 114, 116, 118, 120, 122, 124. For example, some users 128, 130, 132 may have read access to a data resource 118, 120, 122, 124 while other users 128, 130, 132 may have read/write to access to the data resource 118, 120, 122, 124. Also, for example, some users 128, 130, 132 may have use access to a model resource 110, 112, 114, 116. Also, some users 128, 130, 132 may have a higher level of access to a model resource 110, 112, 114, 116. For example, some user's credential may indicate that the user 128, 130, 132 is permitted to train or otherwise modify a model resource 110, 112, 114, 116.

The credential subsystem 104 may store a credential for each user 128, 130, 132 authorized to access the analytics computing system 102 along with data associating the credential with a level of access to the resources 110, 112, 114, 116, 118, 120, 122, 124 of the analytics computing system 102. When a user 128, 130, 132 performs a task at the analytics computing system 102, the credential subsystem 104 may be consulted to determine whether the user 128, 130, 132 has a credential that permits the user 128, 130, 132 to perform the requested task with the resources 110, 112, 114, 116, 118, 120, 122, 124 used by the task.

Consider an example in which the user 128 requests a task that utilizes the model resource 114 and writes to the data resource 118. The credential subsystem 104 may determine the level of access that the user 128 has to the model resource 114 and to the data resource 118. If the user 128 has the proper level of access (e.g., write access to the data resource 118 and use access to the model resource 114) then the credential subsystem 104 may indicate that the user 128 is authorized to execute the task.

In some examples, the credential subsystem 104 may manage user credentials by role. For example, each user 128, 130, 132 may be assigned a role such as, for example, human resources manager, IT administrative user, and/or the like. Each role may be associated with a level of access to the resources 110, 112, 114, 116, 118, 120, 122, 124 of the analytics computing system 102. In this way, the credential subsystem 104 may determine a user's level of access to credential resources by determining a role indicated by the user's credential and then determining the level of access associated with the user's role.

The scheduler subsystem 106 may be configured to schedule automated tasks at the analytics computing system 102. For example, the scheduler subsystem 106 may be provided with an indication of start conditions associated with different automated tasks that have been configured at the analytics computing system 102. When one or more start conditions occur, the scheduler subsystem 106 may initiate execution of the respective tasks associated with the start condition or conditions that are true.

An automated task management subsystem 108 may manage the configuring of automated tasks, for example, as described herein. For example, the automated task management subsystem 108 may configure automated tasks, as described herein. In some examples, the automated task management subsystem 108 maintains a table 126 or other suitable data structure describing automated tasks that are configured at the analytics computing system 102. In the example of FIG. 1, the automated tasks table 126 includes various columns including a Creator column, an Owner(s) column, an Assignee column, and a Permission column. The automated task management subsystem 108 may maintain a record corresponding to various configured automated tasks at the automated task table 126. The record for an automated task may indicate a creator user in the capital Creator column, one or more owner users in the Owner(s) column, and one or more assignee users in the Assignee column. The Permission column may include an indication of whether permission from the assignee user or users has been obtained for the automated task. For example, if the assignee user or users have already indicated permission to execute the automated task with a credential or credentials of the assignee user or users, this may be indicated in the Permission column.

FIG. 1 illustrates an example in which the user 128 is a creator user who creates an automated task by sending a request 140 to create the automated task. The request 140 may include various data descriptive of the requested automated task such as, for example, one or more start conditions for the automated task, and/or one or more resources 110, 112, 114, 116, 118, 120, 122, 124 that will be used to execute the automated task. In some examples, the request 140 may also include an indication of one or more assignee users.

Also, in some examples, the automated task management subsystem 108 may determine whether the automated task utilizes any resources 110, 112, 114, 116, 118, 120, 122, 124 in a way that is not supported by the credential of the creator user 128. If any resources 110, 112, 114, 116, 118, 120, 122, 124 to be used by the automated task cannot be used with the credential of the creator user 128, then the automated task management subsystem 108 may prompt the creator user 128 to provide an indication of an assignee user or users having the appropriate credential or credentials.

In some examples, the request 140 may also indicate an owner user. The owner user may be the creator user 128 and/or another user. An owner user may be authorized to designate one or more assignee users for the automated task. For example, if the owner user indicated by the request 140 is different than the creator user 128, then the automated task management subsystem 108 may, when appropriate, prompt the owner user to provide an indication of one or more assignee users.

In the example of FIG. 1, the user 130 is indicated as an assignee user for the automated task referenced by the request 140. Accordingly, the automated task management subsystem 108 may send an authorization request 142 to the user 130. The authorization request 142 may include a description of the automated task requested by the request 140. In some examples, the authorization request 142 may include additional data such as, for example, an indication of the resource 110, 112, 114, 116, 118, 120, 122, 124 to be used with the assignee user's credential and/or an indication of the type of use of the resource to be used with the assignee user's credential. The assignee user 130 may authorize use of the assignee user's credential for the automated task, or may decline, as described herein.

If the assignee user 130 authorizes use of the assignee user's credential for the automated task, then the automated task management subsystem 108 may configure the automated task to execute upon occurrence of the indicated start condition using the credential of the assignee user 130. It will be appreciated that in some examples, an automated task may utilize credentials from multiple assignee users. Accordingly, the automated task management subsystem 108 may obtain authorizations from each of the multiple assignee users before executing an automated task.

Figure 2:
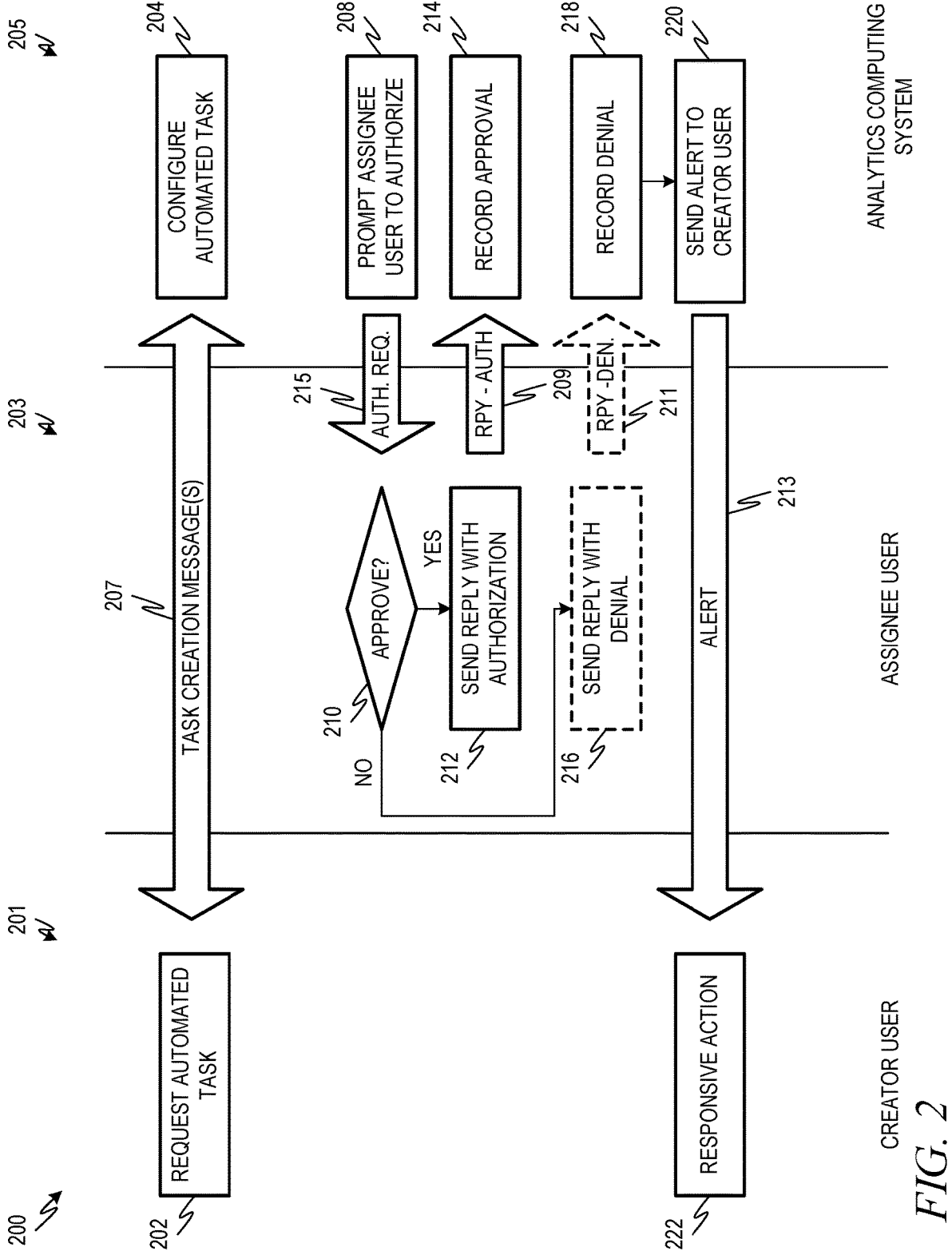
FIG. 2 is a flowchart showing one example of a process flow that may be executed in the environment of FIG. 1 to configure an automated task at the analytics computing system.

FIG. 2 is a flowchart showing one example of a process flow 200 that may be executed in the environment 100 to configure an automated task at the analytics computing system 102. The process flow 200 shows three columns 201, 203, 205. Column 201 includes operations performed by a creator user, for example, via a user computing device associated with the creator user. The creator user may be a user who is creating an automated task. In some examples the creator user is an administrative user whose credential may not indicate authorization to use one or more resources 110, 112, 114, 116, 118, 120, 122, 124 of the analytics computing system 102 that are utilized by the requested automated task.

Column 203 includes operations performed by an assignee user, for example, via a user computing device associated with the assignee user. In some examples the assignee user is a business user or other consumer of the output of the automated task. For example, if the automated task produces a report or alert, the assignee user may be a user who consumes the generated report or alert. Also, in some examples, the assignee user may not be a consumer of the result of the task. In the example illustrated by FIG. 2, the requested automated task includes a single assignee user. It will be appreciated, however, that some automated task may include multiple assignee users. Column 205 includes operations performed by the analytics computing system 102, for example, the automated task management subsystem 108 thereof.

At operation 202, the creator user may initiate configuration of an automated task. The analytics computing system 102 may configure the automated task at operation 204. Configuring the automated task may include exchanging one or more task and creation messages 207 between the creator user (e.g., a user computing device thereof) and the analytics computing system 102. The task creation messages may include, in some examples, a request to create the automated task. The request may include an indication of a start condition for the automated task. The request may also include an indication of one or more resources of the analytics computing system that will be used to execute the automated task. In some examples, the request will include an indication of one or more assignee users having a credential to be used by the analytics computing system to execute the automated task.

In some examples, configuring the automated task at operation 204 may include the analytics computing system 102 analyzing the requested task and determining one or more resources that will be used to execute the task for which the creator user lacks appropriate credentials. The analytics computing system 102 may, then, prompt the creator user to provide an indication of one or more assignee users who have a credential that will permit use of the resources. Also, configuring the automated task at operation 204 may include providing an indication of the start condition or conditions for the automated task to the scheduler subsystem 106.

At operation 208, the analytics computing system 102 may prompt the assignee user to authorize the automated task. For example, the analytics computing system 102 may send to the assignee user (e.g. a user computing device associated with the assignee user) an authorization request 215. The authorization request 215 may include a description of the first automated task. In some examples, the authorization request 215 includes other information such as, for example, an indication of a resource at the analytics computing system 102 that will be accessed using a credential of the assignee user. Also, in some examples, the authorization request 215 will include an indication of the creator user and/or other relevant data.

The assignee user may receive the authorization request 215 and approve or disapprove the automated task at operation 210. If the assignee user approves the automated task, it may indicate that the assignee user approves the use of the assignee user's credential to execute the automated task. To indicate approval, the assignee user (e.g., the user computing device associated therewith) may, at operation 212, send a reply message 209 indicating that the automated task is authorized. The analytics computing system 102 may receive the reply message and record the approval of the assignee user at operation 214. For example, the analytics computing system 102 may access an automated tasks table, such as the automated tasks table 126, and write to a record associated with the automated task an indication that the permission of the assignee user has been obtained. In some examples, the indication is written to a permissions field of the record corresponding to a permissions column of the automated task table.

If the assignee user declines to approve the authorization request 215, then, at optional operation 216, the assignee user (e.g. via the user computing device associated therewith) may send a reply message 211 including a denial of authorization for the automated task. In response, the analytics computing system 102 may record the denial at operation 218. This may include, for example, accessing an automated tasks table, such as the automated tasks table 126. The analytics computing system 102 may right to a record corresponding to the automated task an indication that the approval of the assignee has not been obtained. In some examples, the indication is written to a permissions column of the automated task table.

In some examples, the assignee user may deny approval of the automated task by declining to reply to the authorization request 215. For example, the analytics computing system 102 may execute operation 218 upon determining that no reply to the authorization request 215 has been received within a threshold time period.

If the assignee user fails to approve the automated task, the analytics computing system 102 may send an alert 213 to the creator user at operation 220. The alert 213 may indicate that the automated task lacks an assignee user and, therefore, may lack access to one or more resources used to execute the automated task. The creator user may take a responsive action at operation 222. The responsive action may include, for example, canceling the automated task, modifying the automated task so that it can be executed with a credential of the creator user, and/or selecting a different assignee user for the automated task. If the creator user selects a different assignee user for the automated task, then the analytics computing system 102 may prompt the different assignee user to authorize the automated task, for example, as described herein. In some examples, the responsive action may include canceling the automated task and sending a notification message to the creator user. The creator user may, in some examples, choose to re-open the automated task and make changes such as, for example, changing the resources used by the automated task and/or selecting a different assignee user.

Figure 3:
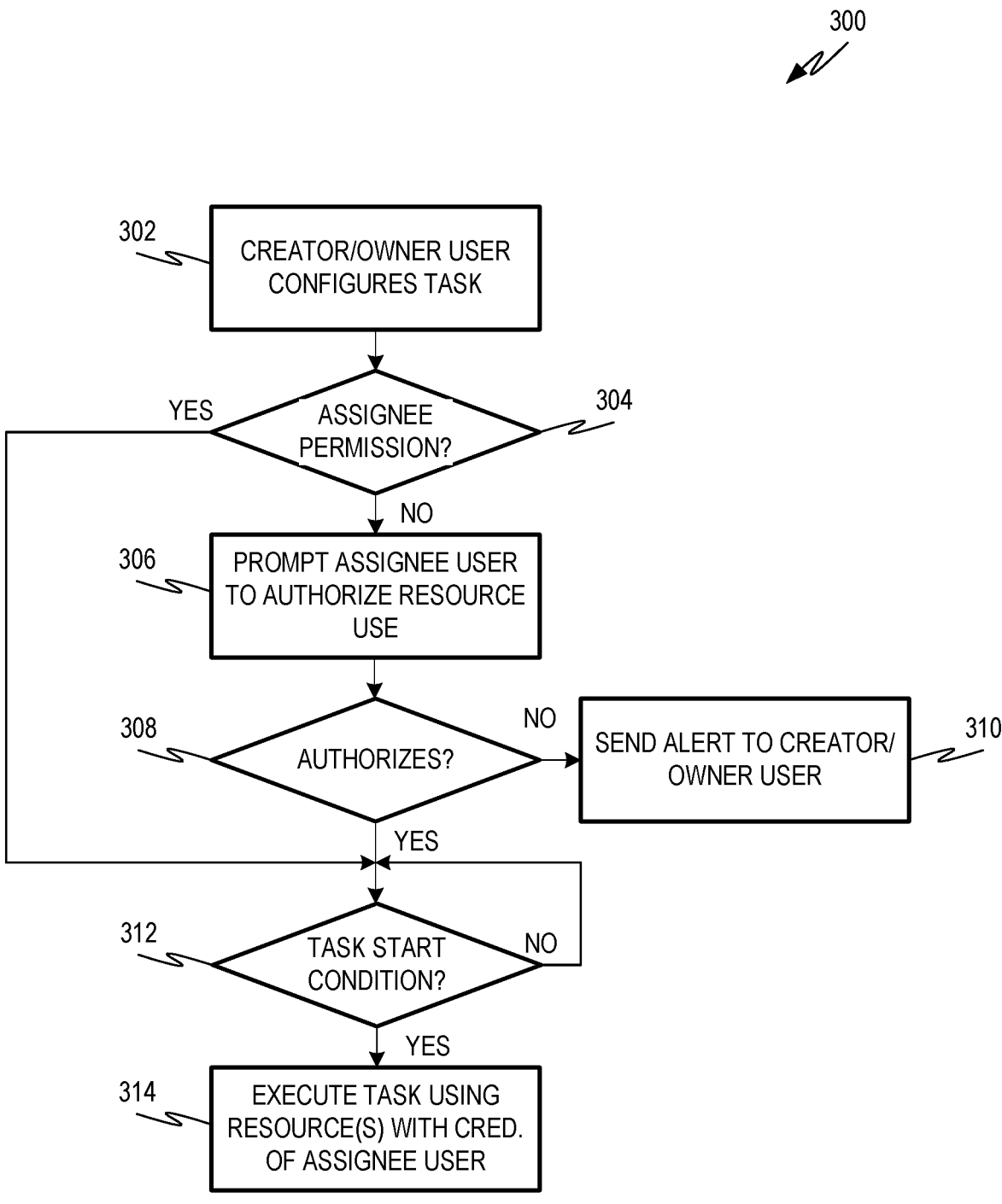
FIG. 3 is a flowchart showing one example of a process flow that may be executed by the analytics computing system of FIG. 1 to execute an automated task.

FIG. 3 is a flowchart showing one example of a process flow 300 that may be executed by the analytics computing system 102 to execute an automated task.

At operation 302, a creator and/or owner user may configure a and an automated task, for example, as described herein. For example, the analytics computing system 102 may receive a request to create the automated task from the creator user, who may also be an owner user. The request to create the automated task may describe a resource of the analytics computing system to be used to execute the automated task, a start condition for the automated task and/or an assignee user for the automated task.

The analytics computing system 102 may determine, at operation 304, whether the assignee user for the automated task has authorized the automated task. This may include, for example, accessing a record corresponding to the automated task from an automated tasks table, such as the automated tasks table 126. The analytics computing system 102 may access a permission field of the record to determine if it indicates the authorization of the assignee user. If the assignee user has authorized the automated task, then the analytics computing system 102 may, at operation 312, execute the automated task using one or more resources with the credential of the assignee user.

If the analytics computing system 102 determines at operation 304 that the assignee user has failed provide permission for the automated task, then, at operation 306, the analytics computing system 102 may prompt the assignee user to authorize the use of the assignee user's credentials for the automated task. This may include, for example, sending an authorization request to the assignee user, for example, as described herein. At operation 308, the analytics computing system 102 may determine if the assignee user has authorized the automated task.

If the assignee user does not authorize the automated task at operation 308, either by sending a reply message indicating denial or failing to respond, then the analytics computing system 102 may send an alert and/or an owner user of the automated task at operation 310. The alerts may indicate that the automated task cannot execute because the assignee user has failed to provide permission to execute the automated task with the assignee user's credential. The creator user and/or the owner user may respond, via an associated user computing device, by selecting a substitute assignee user who may be subsequently prompted by the analytics computing system 102 authorize the automated task for execution with a credential of the substitute assignee user. In some examples, the creator user and/or owner user may respond to the alert by instructing the analytics computing system 102 to execute the automated task using a credential of the creator user and/or owner user. This may occur, for example, if creator user and/or the owner user comprises sufficient credentials to execute the automated task using the indicated resources of the analytics computing system 102. Also, in some examples, if the creator user and lack sufficient credentials to execute the automated task, the analytics computing system 102 may partially execute the automated task. For example, the analytics computing system 102 may execute the automated task to the extent that is possible using the credential of the creator user and/or owner user. In some examples, the creator user and/or owner user may respond to the alert by canceling the automated task. In some examples, the originally-created automated task may be canceled, and the creator user and/or owner user may be prompted to create a new automated task with a different assignee user.

If the assignee user has authorized the automated task, then the analytics computing system (e.g., the scheduler subsystem 106 thereof) may, at operation 312, determine if the task start condition for the automated task has occurred. For example, if the task start condition is the occurrence of a date and/or time, determining whether the task start condition has occurred may include determining whether the current date and/or time meets the date and/or time indicated by the task start condition. In another example, if the task start condition includes a metric having a certain value, determining whether the task start condition has occurred may include monitoring the value of the metric. If the task start condition has not occurred at operation 312, the analytics computing system 102 may continue to test for the occurrence of the task start condition. If the task start condition has occurred, the analytics computing system 102 may execute the task using a resource or resources with credentials of the assignee user at operation 314

Figure 4:
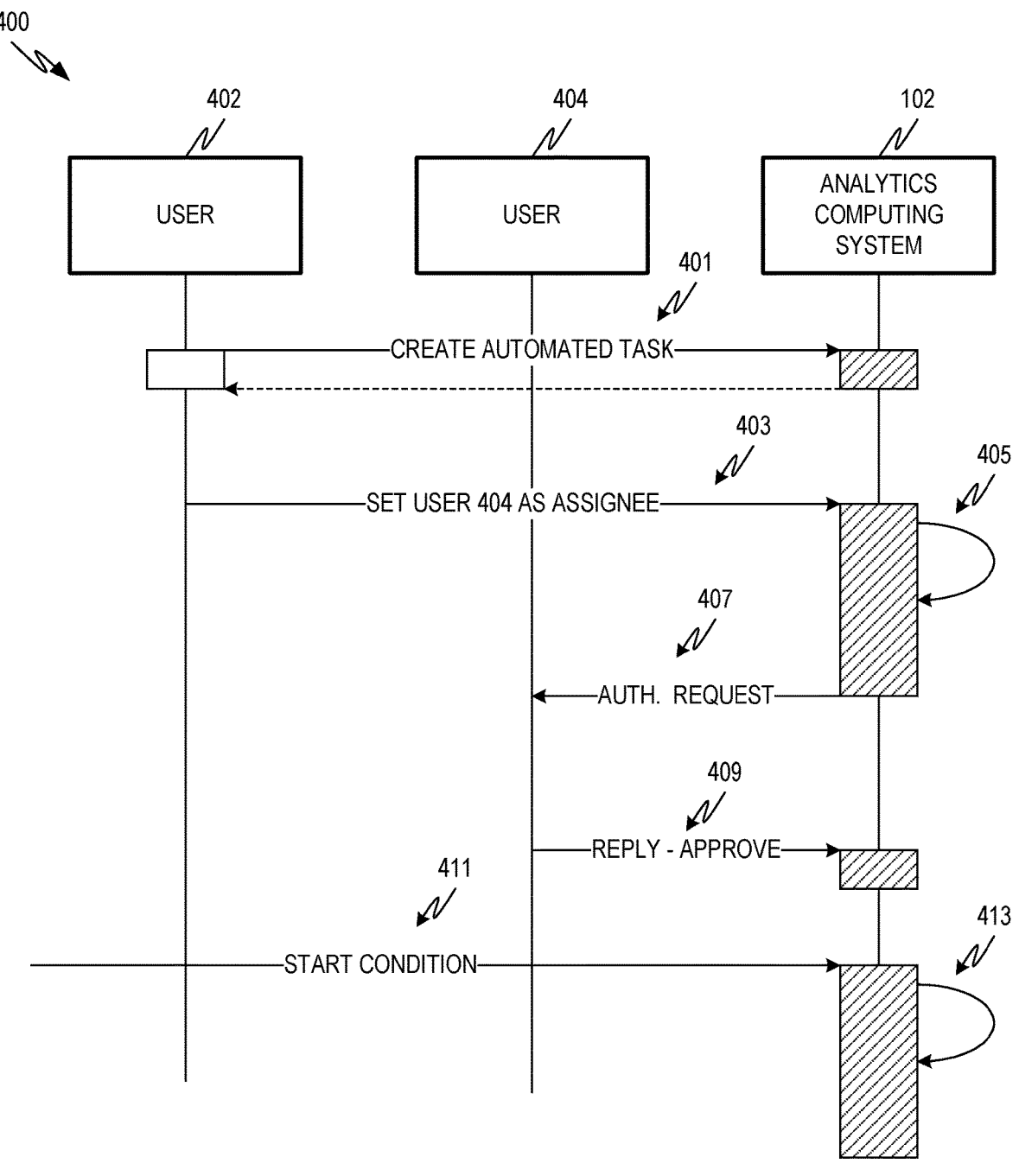
FIG. 4 is a swim lane diagram showing one example of a process flow that may be executed in the environment of FIG. 1 to configure and execute an automated task in the analytics computing system.

FIG. 4 is a swim lane diagram showing one example of a process flow 400 that may be executed in the environment 100 to configure and execute an automated task in the analytics computing system 102. The process flow 400 includes a user 402, a user 404, and the analytics system 102. The user 402 may be the creator user for the automated task and may, via an associated user computing device, create the automated task with the analytics computing system 102 at transaction 401. The transaction 401 may include the creator user 402 sending a request to create the automated task to the analytics computing system 102. In some examples, the transaction 401 may also include the analytics computing system 102 prompting the user 404 to provide an assignee user for the automated task. This may occur, as described herein, when the credential of the creator user 402 is not sufficient to access the resources of the analytics computing system 102 that are to be used to execute the automated task. Also, in some examples, as described herein, the creator user 402 may provide an indication of the assignee user without prompting from the analytics computing system 102.

At transaction 403, the creator user 402 may provide the analytics computing system 102 with an indication that the user 404 is an assignee user for the automated task. The analytics computing system 102 may, at operation 405, begin an authorization process for requesting authorization of the user 404 to utilize the credential of the assignee user 404 to execute the automated task. This may include sending an authorization request 407 to the assignee user 404 (e.g., a user computing device associated therewith). In the example of FIG. 4, the assignee user 404 authorizes the automated task by sending a reply message 409 approving the automated task. The analytics computing system 102 may record the approval, for example, as described herein. The analytics computing system 102 may determine the occurrence of the start condition 411 and begin automatic execution of the automated task at operation 413.

Figure 5:
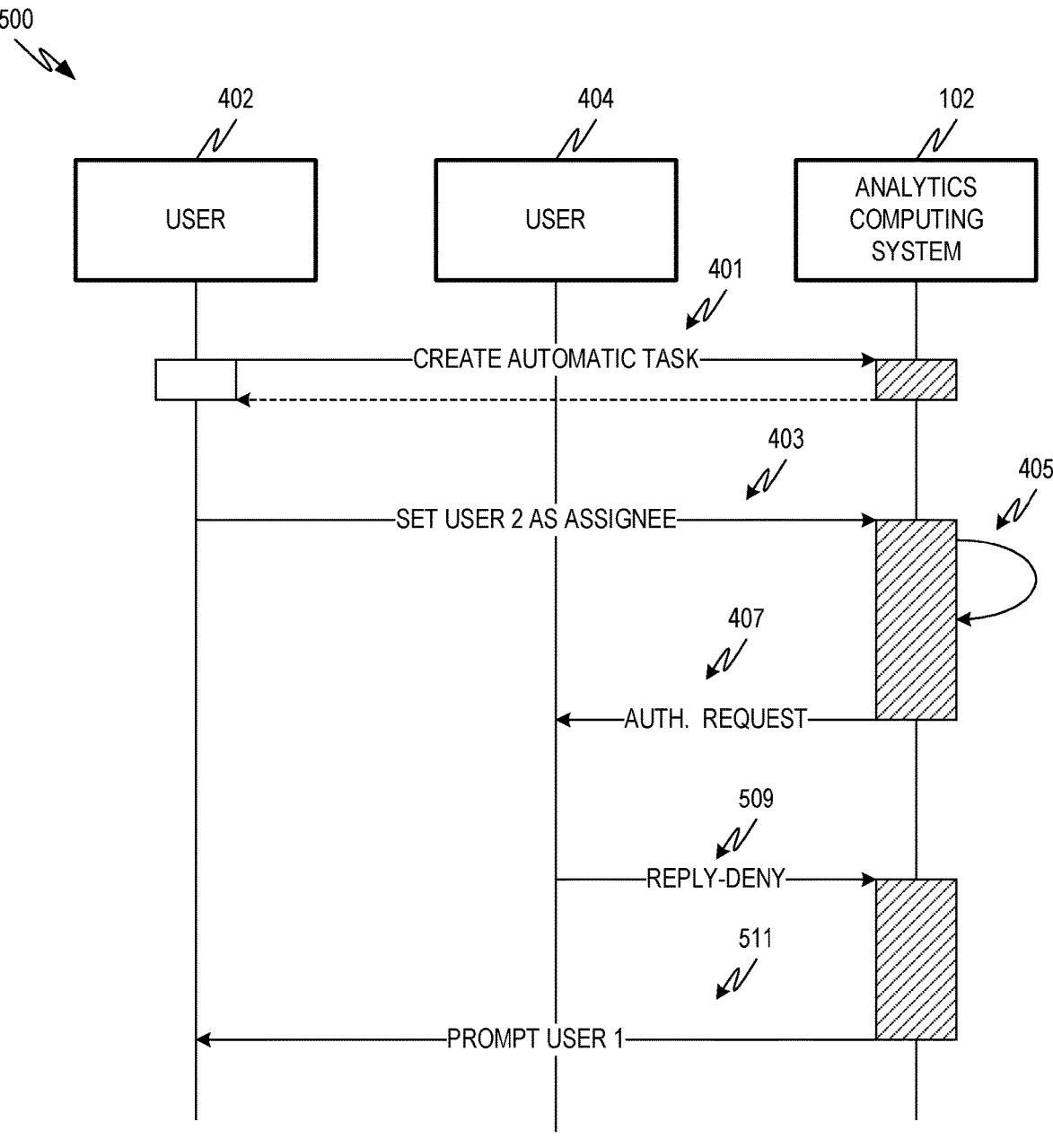
FIG. 5 is a swim lane diagram showing an example of a process flow that may be similar to the process flow 400 of FIG. 4, but illustrating an example in which the assignee user declines to authorize the automated task.

FIG. 5 is a swim lane diagram showing an example of a process flow 500 that may be similar to the process flow 400 of FIG. 4, but illustrating an example in which the assignee user 404 declines to authorize the automated task. In this example, the assignee user 404 may decline to authorize the automated task upon receiving the authorization request 407. The assignee user 404 may send a reply message 509 denying authorization and/or may decline to respond to the authorization request 407. In some examples, instead of sending a reply message 509 denying authorization, the user 404 may make no response to the authorization request 407. If the user makes no response to the authorization request 407, in some examples, the analytics computing system may cancel the automated task when the task start condition is detected. After determining that the assignee user 404 has not authorized the automated task, the analytics computing system 102 may send an alert 511 to the creator user 402. The creator user 402 may take a responsive action, for example, as described herein.

Figure 6:
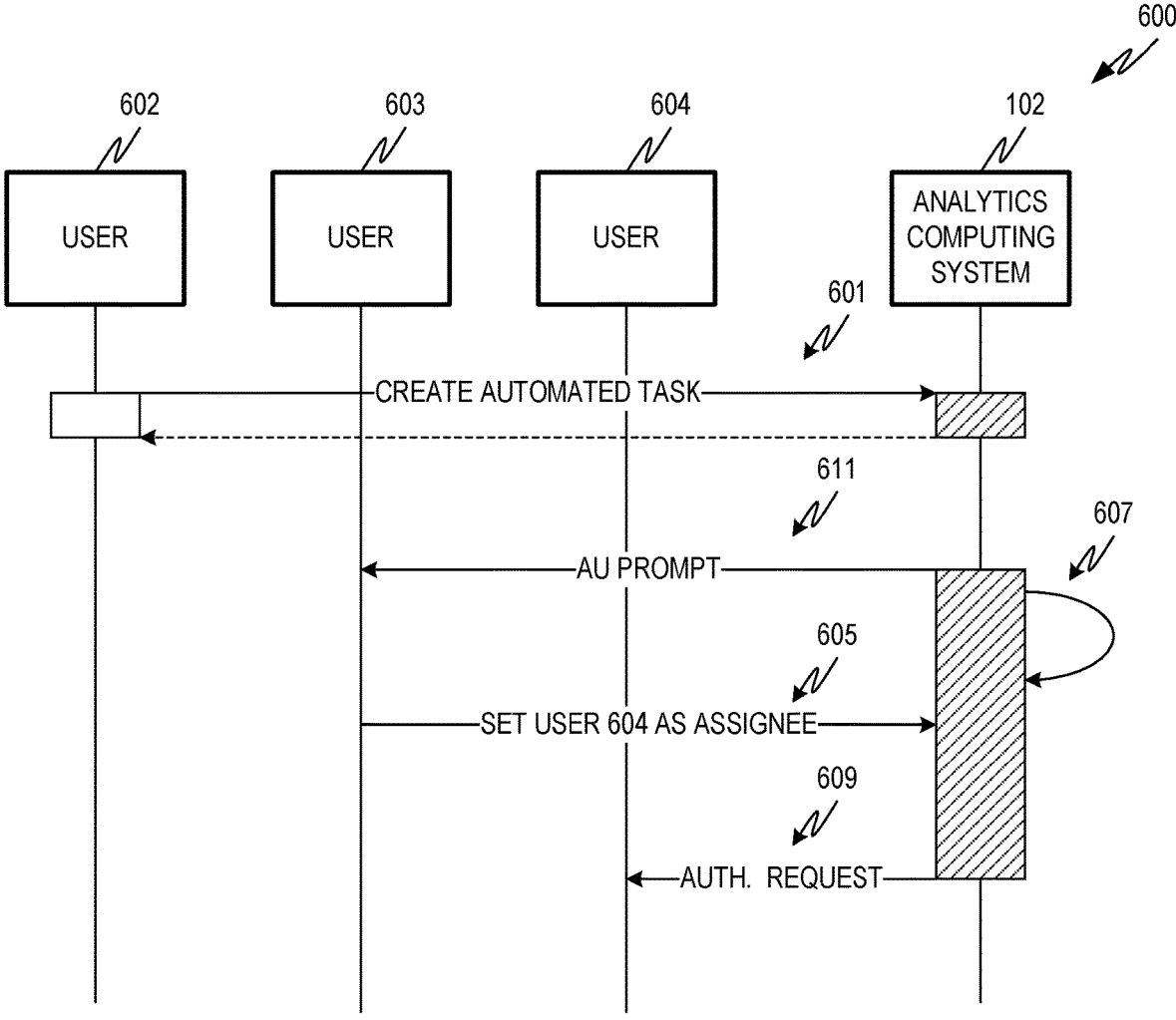
FIG. 6 is a swim lane diagram showing an example of a process flow that may be executed in the environment of FIG. 1 to configure an automated task at the analytics computing system.

FIG. 6 is a swim lane diagram showing an example of a process flow 600 that may be executed in the environment 100 to configure an automated task at the analytics computing system 102. The process flow 600 includes a creator user 602, and assignee user 604, and an owner user 603. The creator user 602, via an associated user computing device, may create the automated task with the analytics computing system 102 at transaction 601. The transaction 601 may include the creator user 602 sending a request to create the automated task to the analytics computing system 102. The request may include an indication of the automated task, an indication of the start condition for the automated task, and an indication of the owner user 603. In some examples, the request may also indicate one or more resources of the analytics computing system 102 that would be used to execute the automated task.

At operation 607, the analytics computing system 102 may begin an assignee routine for the automated task. The assignee routine may include determining that the automated task cannot be completed with a credential of the creator user 602. For example, the creator user 602 may lack sufficient authorization to access all of the resources of the analytics computing system that are used by the automated task. The analytics computing system 102 may send a prompt message 611 to the owner user 603 prompting the owner user 603 to provide an indication of an assignee user for the automated task. The owner user 603 may set the assignee user 604 by sending a message 605 to the analytics computing system 102. The analytics computing system 102 may send an authorization request 609 to the assignee user 604. The assignee user 604 may approve the automated task or deny the automated task, as described herein.

Figure 7:
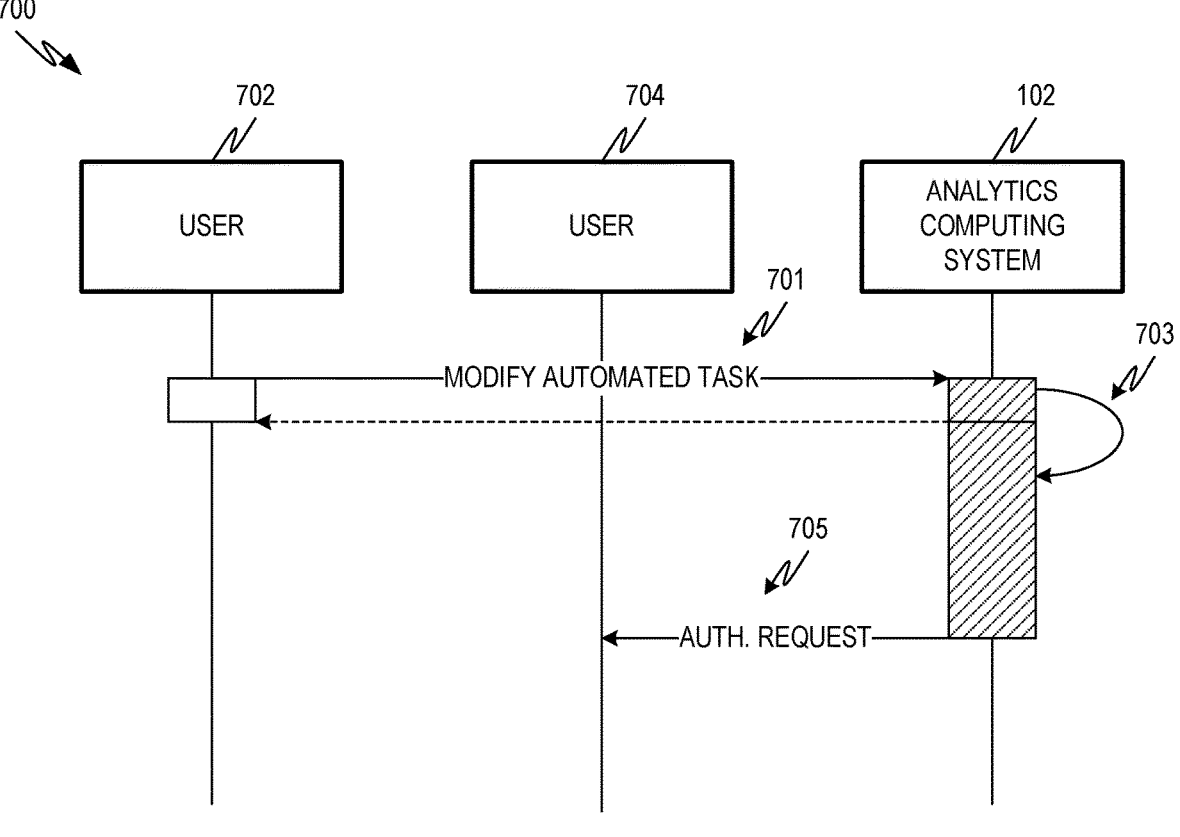
FIG. 7 is a swim lane diagram showing one example of a process flow that may be executed in the environment of FIG. 1 to modify an automated task.

FIG. 7 is a swim lane diagram showing one example of a process flow 700 that may be executed in the environment 100 of FIG. 1 to modify an automated task. For example, a creator user and/or an owner user associated with an automated task may desire to modify the automated task. Modifying the automated task may include causing the automated task to use an additional resource, causing the automated task to use fewer resources, modifying the way that the automated task he uses one or more resources, modifying a start condition for the automated task, and/or the like. When an automated task is modified, it may be desirable to obtain authorization of the assignee user before the modified automated task is executed.

The process flow 700 includes a user 702 who may be an owner user and said/or creator user four and automated task. The process flow 700 also includes an assignee user 704 and the analytics computing system 102. The user 702 may modify the automated task with the analytics computing system 102 at transaction 701. For example, the user 702 may send a modification request to the analytics computing system 102. The modification request may describe one or more modifications to the automated task.

The analytics computing system 102 may begin a modification routine at operation 703. The modification operation 703 may comprise sending an additional authorization request 705 to the assignee user 704. The authorization request 705 may describe requested modification to the automated task. In some examples, the authorization request 705 may indicate one or more resources of the analytics computing system 102 that will be used by the modified automated task. Also, in some examples the authorization request 705 may indicate changes to the automated request that would be implemented by the modification. The assignee user 704 may approve the modified automated request, for example, by sending a reply message indicating approval as described herein. If the assignee user 704 approves the modified automated request, then the modified automated request may execute at the analytics computing system 102 in response to the next instance of the start condition. The assignee user 704 may also disapprove the modified automated task, for example, by sending a reply message indicating disapproval or by failing to respond to the authorization request 705. If the assignee user 704 disapproves the modified automated task, the analytics computing system 102 may respond as described herein when the assignee user fails to approve an automated task. For example, the analytics computing system 102 may send an alert message to the user 702, who may take a responsive action as described herein.

EXAMPLES

Example 1 is an analytics computing system, comprising: at least one processor programmed to perform operations comprising: receiving, from a first user computing device associated with a first user, a request to create a first automated task at the analytics computing system, the request describing: a first resource of the analytics computing system to be used by the analytics computing system to execute the first automated task, the first resource being a data resource or a model resource; a first assignee user having a credential to be used by the analytics computing system to access the first resource while executing the first automated task; and a first start condition for the first automated task; sending a first authorization request to a first assignee user computing device associated with the first assignee user, the first authorization request describing the first automated task; receiving, from the first assignee user computing device, a first reply message indicating that the first assignee user authorizes use of the credential of the first assignee user for the first automated task; and configuring the first automated task to execute using the credential of the first assignee user upon occurrence of the first start condition for the first automated task.

In Example 2, the subject matter of Example 1 optionally includes the sending of the authorization request being before the occurrence of the first start condition for the first automated task.

In Example 3, the subject matter of any one or more of Examples 1-2 optionally includes the operations further comprising: receiving, from the first user computing device, a request to modify the first automated task to a modified first automated task; sending, to the first assignee user computing device, a second authorization request, the second authorization request describing the modified first automated task; and receiving, from the first assignee user computing device, a second reply message indicating that the first assignee user authorizes use of the credential of the first assignee user for the modified first automated task.

In Example 4, the subject matter of any one or more of Examples 1-3 optionally includes the operations further comprising: receiving, from the first user computing device, a request to create a second automated task, the request to create the second automated task comprising: a second resource of the analytics computing system to be used by the analytics computing system to execute the second automated task, the second resource being a data resource or a model resource; a second assignee user having a credential to be used by the analytics computing system to access the second resource while executing the second automated task; and a second start condition for the second automated task; sending a second authorization request to a second assignee user computing device associated with the second assignee user, the second authorization request describing the second automated task; and determining that the second assignee user has failed to authorize the second automated task.

In Example 5, the subject matter of Example 4 optionally includes the operations further comprising receiving, from the second assignee user computing device, a second reply message, the second reply message indicating that the second assignee user does not authorize the second automated task.

In Example 6, the subject matter of any one or more of Examples 4-5 optionally includes the operations further comprising determining that the second assignee user has failed to respond to the second authorization request.

In Example 7, the subject matter of any one or more of Examples 4-6 optionally includes the operations further comprising after determining that the second assignee user has failed to authorize the second automated task, sending a request message to the first user computing device, the request message requesting a different assignee user having a credential that can be used to access the second resource while executing the second automated task.

In Example 8, the subject matter of any one or more of Examples 1-7 optionally includes the operations further comprising: receiving, from the first user computing device, a request to create a third automated task at the analytics computing system, the request describing: a third resource of the analytics computing system to be used by the analytics computing system to execute the third automated task, the third resource being a data resource or a model resource; and a third start condition for the third automated task; an owner user for the third automated task, the owner user being different than the first user; receiving an assignee user message from an owner user computing device associated with the owner user, the assignee user message describing a third assignee user having a credential to be used by the analytics computing system to access the third resource while executing the third automated task; and sending a third authorization request to a third assignee user computing device associated with the third assignee user, the third authorization request describing the third automated task.

Example 9 is a method of executing and automated task in an analytics computing system, the method comprising: receiving, by the analytics computing system and from a first user computing device associated with a first user, a request to create a first automated task at the analytics computing system, the request describing: a first resource of the analytics computing system to be used by the analytics computing system to execute the first automated task, the first resource being a data resource or a model resource; a first assignee user having a credential to be used by the analytics computing system to access the first resource while executing the first automated task; and a first start condition for the first automated task; sending, by the analytics computing system, a first authorization request to a first assignee user computing device associated with the first assignee user, the first authorization request describing the first automated task; receiving, by the analytics computing system and from the first assignee user computing device, a first reply message indicating that the first assignee user authorizes use of the credential of the first assignee user for the first automated task; and configuring, by the analytics computing system, the first automated task to execute using the credential of the first assignee user upon occurrence of the first start condition for the first automated task.

In Example 10, the subject matter of Example 9 optionally includes the sending of the authorization request being before the occurrence of the first start condition for the first automated task.

In Example 11, the subject matter of any one or more of Examples 9-10 optionally includes receiving, by the analytics computing system and from the first user computing device, a request to modify the first automated task to a modified first automated task; sending, by the analytics computing system and to the first assignee user computing device, a second authorization request, the second authorization request describing the modified first automated task; and receiving, by the analytics computing system and from the first assignee user computing device, a second reply message indicating that the first assignee user authorizes use of the credential of the first assignee user for the modified first automated task.

In Example 12, the subject matter of any one or more of Examples 9-11 optionally includes receiving, by the analytics computing system and from the first user computing device, a request to create a second automated task, the request to create the second automated task comprising: a second resource of the analytics computing system to be used by the analytics computing system to execute the second automated task, the second resource being a data resource or a model resource; a second assignee user having a credential to be used by the analytics computing system to access the second resource while executing the second automated task; and a second start condition for the second automated task; sending, by the analytics computing system, a second authorization request to a second assignee user computing device associated with the second assignee user, the second authorization request describing the second automated task; and determining, by the analytics computing system, that the second assignee user has failed to authorize the second automated task.

In Example 13, the subject matter of Example 12 optionally includes receiving, by the analytics computing system and from the second assignee user computing device, a second reply message, the second reply message indicating that the second assignee user does not authorize the second automated task.

In Example 14, the subject matter of any one or more of Examples 12-13 optionally includes determining, by the analytics computing system, that the second assignee user has failed to respond to the second authorization request.

In Example 15, the subject matter of any one or more of Examples 12-14 optionally includes after determining that the second assignee user has failed to authorize the second automated task, sending, by the analytics computing system, a request message to the first user computing device, the request message requesting a different assignee user having a credential that can be used to access the second resource while executing the second automated task.

Example 16 is a non-transitory machine-readable medium comprising instructions thereon that, when executed by one or more processors, cause the one or more processors to perform operations comprising: receiving, from a first user computing device associated with a first user, a request to create a first automated task at an analytics computing system, the request describing: a first resource of the analytics computing system to be used by the analytics computing system to execute the first automated task, the first resource being a data resource or a model resource; a first assignee user having a credential to be used by the analytics computing system to access the first resource while executing the first automated task; and a first start condition for the first automated task; sending a first authorization request to a first assignee user computing device associated with the first assignee user, the first authorization request describing the first automated task; receiving, from the first assignee user computing device, a first reply message indicating that the first assignee user authorizes use of the credential of the first assignee user for the first automated task; and configuring the first automated task to execute using the credential of the first assignee user upon occurrence of the first start condition for the first automated task.

In Example 17, the subject matter of Example 16 optionally includes the sending of the authorization request being before the occurrence of the first start condition for the first automated task.

In Example 18, the subject matter of any one or more of Examples 16-17 optionally includes the operations further comprising: receiving, from the first user computing device, a request to modify the first automated task to a modified first automated task; sending, to the first assignee user computing device, a second authorization request, the second authorization request describing the modified first automated task; and receiving, from the first assignee user computing device, a second reply message indicating that the first assignee user authorizes use of the credential of the first assignee user for the modified first automated task.

In Example 19, the subject matter of any one or more of Examples 16-18 optionally includes the operations further comprising: receiving, from the first user computing device, a request to create a second automated task, the request to create the second automated task comprising: a second resource of the analytics computing system to be used by the analytics computing system to execute the second automated task, the second resource being a data resource or a model resource; a second assignee user having a credential to be used by the analytics computing system to access the second resource while executing the second automated task; and a second start condition for the second automated task; sending a second authorization request to a second assignee user computing device associated with the second assignee user, the second authorization request describing the second automated task; and determining that the second assignee user has failed to authorize the second automated task.

In Example 20, the subject matter of Example 19 optionally includes the operations further comprising receiving, from the second assignee user computing device, a second reply message, the second reply message indicating that the second assignee user does not authorize the second automated task.

Figure 8:
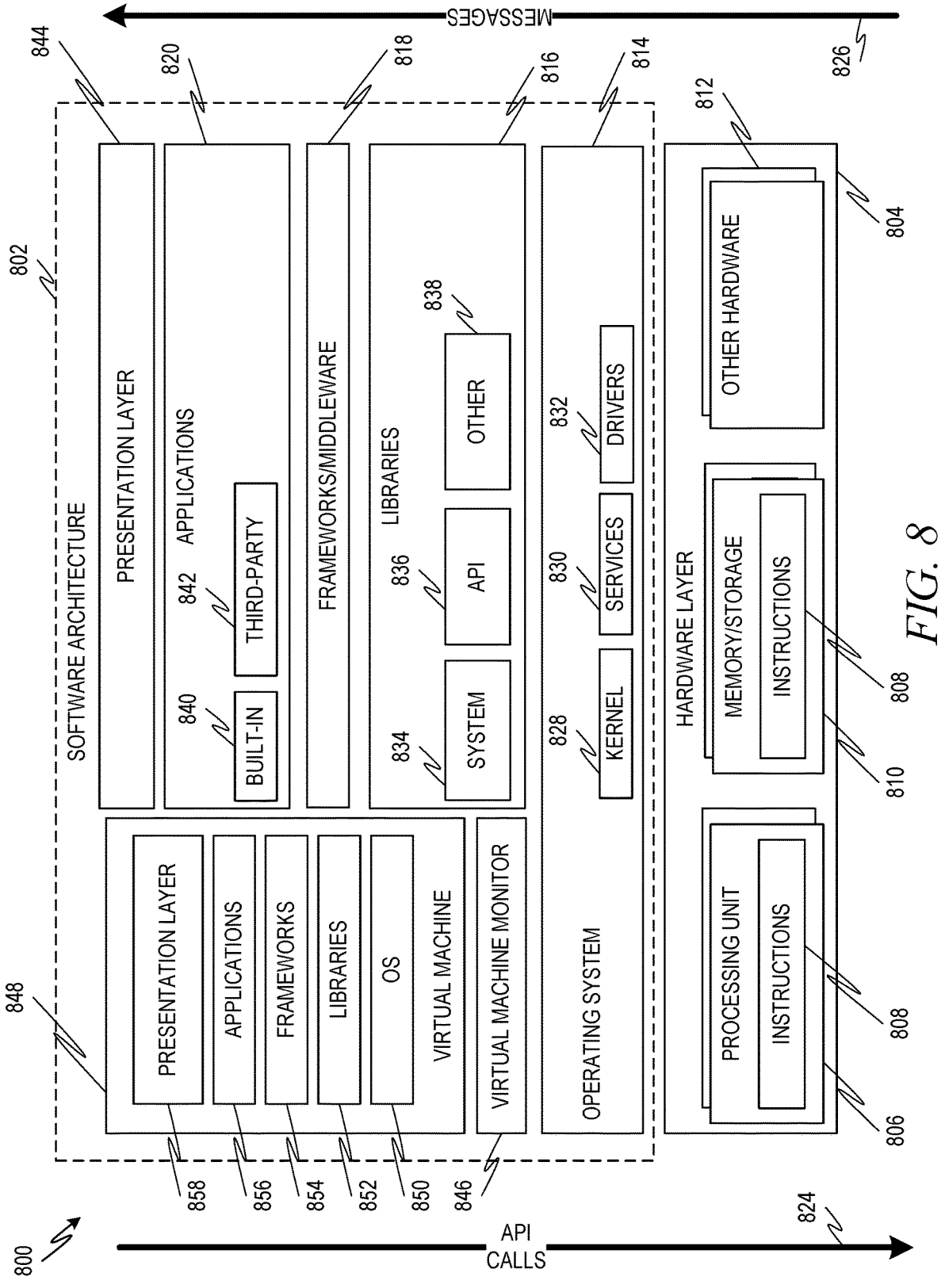
FIG. 8 is a block diagram showing one example of an architecture for a computing device.

FIG. 8 is a block diagram 800 showing one example of a software architecture 802 for a computing device. The architecture 802 may be used in conjunction with various hardware architectures, for example, as described herein. FIG. 8 is merely a non-limiting example of a software architecture and many other architectures may be implemented to facilitate the functionality described herein. A representative hardware layer 804 is illustrated and can represent, for example, any of the above referenced computing devices. In some examples, the hardware layer 804 may be implemented according to the architecture of the computer system of FIG. 9.

The representative hardware layer 804 comprises one or more processing units 806 having associated executable instructions 808. Executable instructions 808 represent the executable instructions of the software architecture 802, including implementation of the methods, modules, subsystems, and components, and so forth described herein and may also include memory and/or storage modules 810, which also have executable instructions 808. Hardware layer 804 may also comprise other hardware as indicated by other hardware 812 which represents any other hardware of the hardware layer 804, such as the other hardware illustrated as part of the architecture 802.

In the example architecture of FIG. 8, the software architecture 802 may be conceptualized as a stack of layers where each layer provides particular functionality. For example, the software architecture 802 may include layers such as an operating system 814, libraries 816, middleware layer 818, applications 820, and presentation layer 844. Operationally, the applications 820 and/or other components within the layers may invoke API calls 824 through the software stack and access a response, returned values, and so forth illustrated as messages 826 in response to the API calls 824. The layers illustrated are representative in nature and not all software architectures have all layers. For example, some mobile or special purpose operating systems may not provide a middleware layer 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. In some examples, the services 830 include an interrupt service. The interrupt service may detect the receipt of an interrupt and, in response, cause the architecture 802 to pause its current processing and execute an interrupt service routine (ISR) when an interrupt is accessed.

The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than to interface directly with the underlying operating system 814 functionality (e.g., kernel 828, services 830 and/or drivers 832). The libraries 816 may include system 834 libraries (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The middleware layer 818 (also sometimes referred to as frameworks) may provide a higher-level common infrastructure that may be utilized by the applications 820 and/or other software components/modules. For example, the middleware layer 818 may provide various graphic user interface (GUI) functions, high-level resource management, high-level location services, and so forth. The middleware layer 818 may provide a broad spectrum of other APIs that may be utilized by the applications 820 and/or other software components/modules, some of which may be specific to a particular operating system or platform.

The applications 820 includes built-in applications 840 and/or third-party applications 842. Examples of representative built-in applications 840 may include, but are not limited to, a contacts application, a browser application, a book reader application, a location application, a media application, a messaging application, and/or a game application. Third-party applications 842 may include any of the built-in applications 840 as well as a broad assortment of other applications. In a specific example, the third-party application 842 (e.g., an application developed using the Android™ or iOS™ software development kit (SDK) by an entity other than the vendor of the particular platform) may be mobile software running on a mobile operating system such as iOS™ Android™, Windows® Phone, or other mobile computing device operating systems. In this example, the third-party application 842 may invoke the API calls 824 provided by the mobile operating system such as operating system 814 to facilitate functionality described herein.

The applications 820 may utilize built-in operating system functions (e.g., kernel 828, services 830 and/or drivers 832), libraries (e.g., system 834, API libraries 836, and other libraries 838), and middleware layer 818 to create user interfaces to interact with users of the system. Alternatively, or additionally, in some systems interactions with a user may occur through a presentation layer, such as presentation layer 844. In these systems, the application/module "logic" can be separated from the aspects of the application/module that interact with a user.

Some software architectures utilize virtual machines. In the example of FIG. 8, this is illustrated by virtual machine 848. A virtual machine creates a software environment where applications/modules can execute as if they were executing on a hardware computing device. A virtual machine is hosted by a host operating system (operating system 814) and typically, although not always, has a virtual machine monitor 846, which manages the operation of the virtual machine as well as the interface with the host operating system (i.e., operating system 814). A software architecture executes within the virtual machine such as an operating system 850, libraries 852, frameworks/middleware 854, applications 856 and/or presentation layer 858. These layers of software architecture executing within the virtual machine 848 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 9:
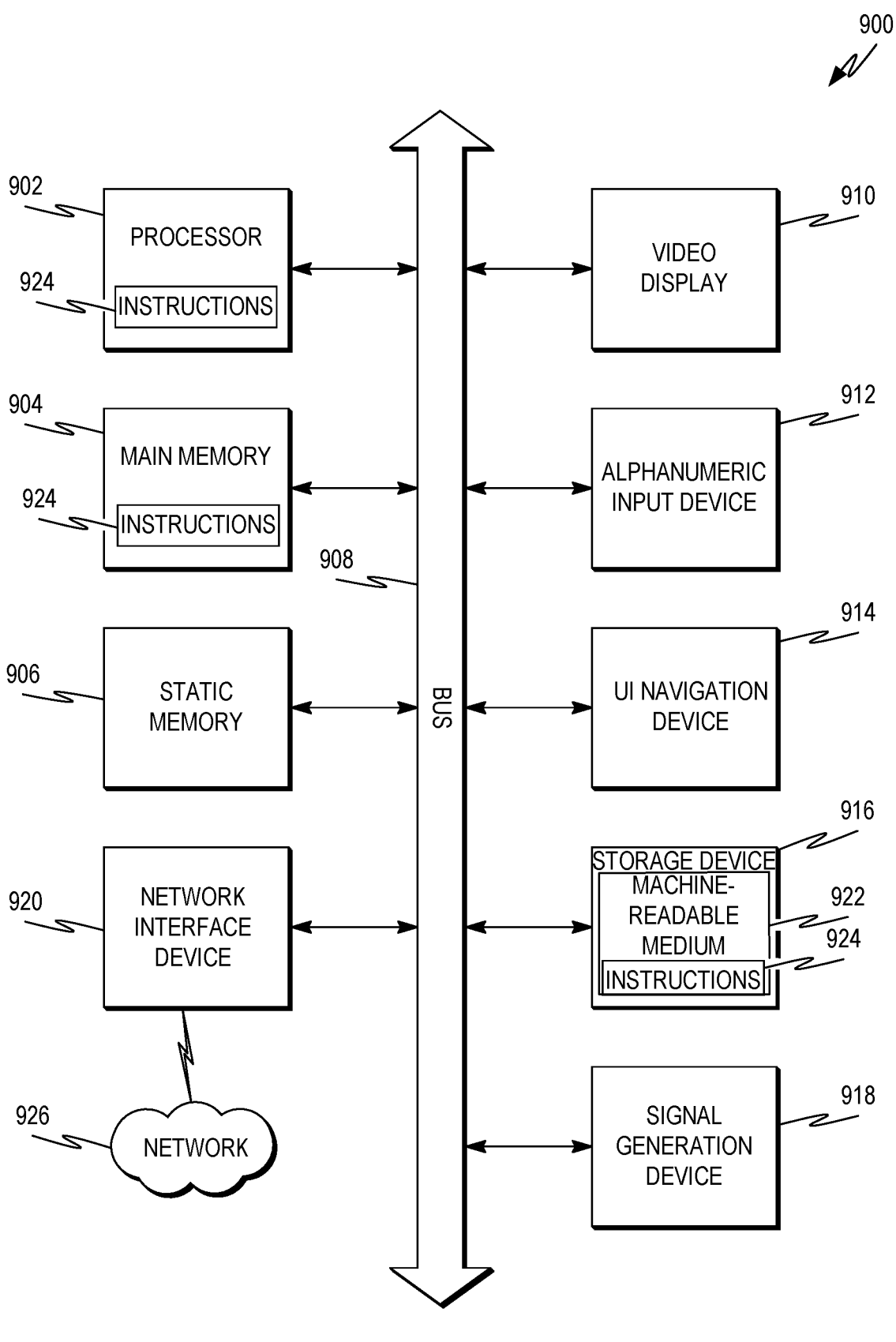
FIG. 9 is a block diagram of a machine in the example form of a computer system within which instructions may be executed for causing the machine to perform any one or more of the methodologies discussed herein.

FIG. 9 is a block diagram of a machine in the example form of a computer system 900 within which instructions 924 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard or a touch-sensitive display screen), a user interface (UI) navigation (or cursor control) device 914 (e.g., a mouse), a disk drive unit 916, a signal generation device 918 (e.g., a speaker), and a network interface device 920.

Machine-Readable Medium

The disk drive unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, with the main memory 904 and the processor 902 also constituting machine-readable media 922.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding, or carrying instructions 924 for execution by the machine and that cause the machine to perform any one or more of the methodologies of the present disclosure, or that is capable of storing, encoding, or carrying data structures utilized by or associated with such instructions 924. The term "machine-readable medium" shall accordingly be taken to include, but not be limited to, solid-state memories, and optical and magnetic media. Specific examples of machine-readable media 922 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 924 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. An analytics computing system, comprising:

at least one processor programmed to perform operations comprising:

receiving, from a first user computing device associated with a first user, a request to create a first automated task at the analytics computing system, the request describing:

a first resource of the analytics computing system to be used by the analytics computing system to execute the first automated task, the first resource being a data resource or a model resource;

a first assignee user having a credential to be used by the analytics computing system to access the first resource while executing the first automated task; and a first start condition for the first automated task;

sending a first authorization request to a first assignee user computing device associated with the first assignee user, the first authorization request describing the first automated task;

determining that the first assignee user failed to authorize the first automated task;

after determining that the first assignee user failed to authorize the first automated task, sending a request message to the first user computing device, the request message requesting a second assignee user having a credential that can be used to access the first resource while executing the first automated task;

sending a second authorization request to a second assignee user computing device associated with the second assignee user, the second authorization request describing the first automated task;

receiving, from the second assignee user computing device, a reply message indicating that the second assignee user authorizes use of the credential of the second assignee user for the first automated task; and configuring the first automated task to execute using the credential of the second assignee user upon occurrence of the first start condition for the first automated task.

2. The analytics computing system of claim 1, the sending of the second authorization request being before the occurrence of the first start condition for the first automated task.

3. The analytics computing system of claim 1, the operations further comprising:

receiving, from the first user computing device, a request to modify the first automated task to a modified first automated task;

sending, to the second assignee user computing device, an additional authorization request, the additional authorization request describing the modified first automated task; and receiving, from the second assignee user computing device, an additional reply message indicating that the second assignee user authorizes use of the credential of the second assignee user for the modified first automated task.

4. The analytics computing system of claim 1, the operations further comprising:

receiving, from the first user computing device, a request to create a second automated task, the request to create the second automated task comprising:

a second resource of the analytics computing system to be used by the analytics computing system to execute the second automated task, the second resource being a data resource or a model resource;

a third assignee user having a credential to be used by the analytics computing system to access the second resource while executing the second automated task; and a second start condition for the second automated task;

sending a third authorization request to a third assignee user computing device associated with the third assignee user, the third authorization request describing the second automated task;

receiving, from the third assignee user computing device, a reply message indicating that the third assignee user authorizes use of the credential of the third assignee user for the second automated task; and configuring the second automated task to execute using the credential of the third assignee user upon occurrence of the second start condition for the second automated task.

5. The analytics computing system of claim 1, the operations further comprising receiving, from the first assignee user computing device, a reply message indicating that the first assignee user does not authorize the first automated task.

6. The analytics computing system of claim 1, the operations further comprising determining that the first assignee user has failed to respond to the first authorization request.

7. The analytics computing system of claim 1, the operations further comprising:

receiving, from the first user computing device, a request to create a third automated task at the analytics computing system, the request describing:

a third resource of the analytics computing system to be used by the analytics computing system to execute the third automated task, the third resource being a data resource or a model resource;

a third start condition for the third automated task; and an owner user for the third automated task, the owner user being different than the first user;

receiving an assignee user message from an owner user computing device associated with the owner user, the assignee user message describing a third assignee user having a credential to be used by the analytics computing system to access the third resource while executing the third automated task; and sending a third authorization request to a third assignee user computing device associated with the third assignee user, the third authorization request describing the third automated task.

8. A method of executing and automated task in an analytics computing system, the method comprising:

receiving, by the analytics computing system and from a first user computing device associated with a first user, a request to create a first automated task at the analytics computing system, the request describing:

a first resource of the analytics computing system to be used by the analytics computing system to execute the first automated task, the first resource being a data resource or a model resource;

a first assignee user having a credential to be used by the analytics computing system to access the first resource while executing the first automated task; and a first start condition for the first automated task;

sending, by the analytics computing system, a first authorization request to a first assignee user computing device associated with the first assignee user, the first authorization request describing the first automated task;

determining that the first assignee user failed to authorize the first automated task;

after determining that the first assignee user failed to authorize the first automated task, sending a request message to the first user computing device, the request message requesting a second assignee user having a credential that can be used to access the first resource while executing the first automated task;

sending a second authorization request to a second assignee user computing device associated with the second assignee user, the second authorization request describing the first automated task;

receiving, by the analytics computing system and from the second assignee user computing device, a first reply message indicating that the second assignee user authorizes use of the credential of the second assignee user for the first automated task; and configuring, by the analytics computing system, the first automated task to execute using the credential of the second assignee user upon occurrence of the first start condition for the first automated task.

9. The method of claim 8, the sending of the second authorization request being before the occurrence of the first start condition for the first automated task.

10. The method of claim 8, further comprising:

receiving, by the analytics computing system and from the first user computing device, a request to modify the first automated task to a modified first automated task;

sending, by the analytics computing system and to the second assignee user computing device, an additional authorization request, the additional authorization request describing the modified first automated task; and receiving, by the analytics computing system and from the second assignee user computing device, an additional reply message indicating that the second assignee user authorizes use of the credential of the second assignee user for the modified first automated task.

11. The method of claim 8, further comprising:

receiving, by the analytics computing system and from the first user computing device, a request to create a second automated task, the request to create the second automated task comprising:

a second resource of the analytics computing system to be used by the analytics computing system to execute the second automated task, the second resource being a data resource or a model resource;

a third assignee user having a credential to be used by the analytics computing system to access the second resource while executing the second automated task; and a second start condition for the second automated task;

sending, by the analytics computing system, a third authorization request to a third assignee user computing device associated with the third assignee user, the third authorization request describing the second automated task;

receiving, from the third assignee user computing device, a reply message indicating that the third assignee user authorizes use of the credential of the third assignee user for the second automated task; and configuring the second automated task to execute using the credential of the third assignee user upon occurrence of the second start condition for the second automated task.

12. The method of claim 8, further comprising receiving, by the analytics computing system and from the first assignee user computing device, a reply message indicating that the first assignee user does not authorize the first automated task.

13. The method of claim 8, further comprising determining, by the analytics computing system, that the first assignee user has failed to respond to the first authorization request.

14. A non-transitory machine-readable medium comprising instructions thereon that, when executed by one or more processors, cause the one or more processors to perform operations comprising:

receiving, from a first user computing device associated with a first user, a request to create a first automated task at an analytics computing system, the request describing:

a first resource of the analytics computing system to be used by the analytics computing system to execute the first automated task, the first resource being a data resource or a model resource;

a first assignee user having a credential to be used by the analytics computing system to access the first resource while executing the first automated task; and a first start condition for the first automated task;

sending a first authorization request to a first assignee user computing device associated with the first assignee user, the first authorization request describing the first automated task;

determining that the first assignee user failed to authorize the first automated task;

after determining that the first assignee user failed to authorize the first automated task, sending a request message to the first user computing device, the request message requesting a second assignee user having a credential that can be used to access the first resource while executing the first automated task;

sending a second authorization request to a second assignee user computing device associated with the second assignee user, the second authorization request describing the first automated task;

receiving, from the second assignee user computing device, a first reply message indicating that the second assignee user authorizes use of the credential of the second assignee user for the first automated task; and configuring the first automated task to execute using the credential of the second assignee user upon occurrence of the first start condition for the first automated task.

15. The medium of claim 14, the sending of the second authorization request being before the occurrence of the first start condition for the first automated task.

16. The medium of claim 14, the operations further comprising:

receiving, from the first user computing device, a request to modify the first automated task to a modified first automated task;

sending, to the first assignee user computing device, an additional authorization request, the additional authorization request describing the modified first automated task; and receiving, from the second assignee user computing device, an additional reply message indicating that the second assignee user authorizes use of the credential of the second assignee user for the modified first automated task.

17. The medium of claim 14, the operations further comprising:

receiving, from the first user computing device, a request to create a second automated task, the request to create the second automated task comprising:

a second resource of the analytics computing system to be used by the analytics computing system to execute the second automated task, the second resource being a data resource or a model resource;

a third assignee user having a credential to be used by the analytics computing system to access the second resource while executing the second automated task; and a second start condition for the second automated task;

sending a third authorization request to a third assignee user computing device associated with the third assignee user, the third authorization request describing the second automated task;

receiving, from the third assignee user computing device, a reply message indicating that the third assignee user authorizes use of the credential of the third assignee user for the second automated task; and configuring the second automated task to execute using the credential of the third assignee user upon occurrence of the second start condition for the second automated task.

18. The medium of claim 14, the operations further comprising receiving, from the first assignee user computing device, a reply message indicating that the first assignee user does not authorize the first automated task.

19. The medium of claim 14, the operations further comprising determining that the first assignee user has failed to respond to the first authorization request.

20. The medium of claim 14, the operations further comprising:

receiving, from the first user computing device, a request to create a third automated task at the analytics computing system, the request describing:

a third resource of the analytics computing system to be used by the analytics computing system to execute the third automated task, the third resource being a data resource or a model resource;

a third start condition for the third automated task; and an owner user for the third automated task, the owner user being different than the first user;

receiving an assignee user message from an owner user computing device associated with the owner user, the assignee user message describing a third assignee user having a credential to be used by the analytics computing system to access the third resource while executing the third automated task; and sending a third authorization request to a third assignee user computing device associated with the third assignee user, the third authorization request describing the third automated task.

\* \* \* \* \*